INVENTOR.
DALE E. CARROLL
BY
Warren H. Schmieding
ATTORNEY

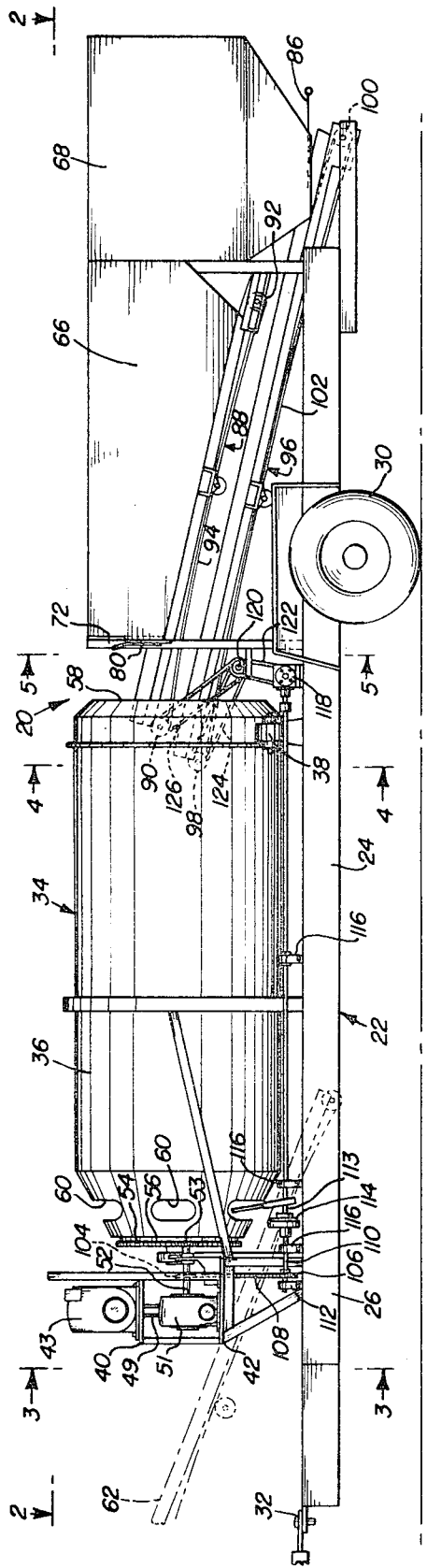

June 6, 1972    D. E. CARROLL    3,667,736
MOBILE MIXING MACHINE

Filed Aug. 28, 1969    3 Sheets-Sheet 3

INVENTOR.
DALE E. CARROLL
BY
*Warren H. F. Schmierling*
ATTORNEY

United States Patent Office 3,667,736
Patented June 6, 1972

3,667,736
MOBILE MIXING MACHINE
Dale E. Carroll, 13864 Putney Road,
Poway, Calif. 92064
Filed Aug. 28, 1969, Ser. No. 853,770
Int. Cl. B28c 5/20, 5/42, 7/06
U.S. Cl. 259—161
3 Claims

ABSTRACT OF THE DISCLOSURE

A mobile mixing machine includes a plurality of containers, one for each of the materials which are to be mixed. Superimposed conveyors are disposed below the containers, one conveyor extending rearwardly farther than the other. The outlet of one of the containers is disposed rearwardly of the rear end of the other conveyor. The conveyors move the materials toward a mixing chamber, the latter being preferably of the rotary type, the axis of which extends horizontally.

BACKGROUND OF THE INVENTION (1) Field of the invention

The invention is directed to mixing machines in which the materials which are to be mixed are conveyed by conveyors to a mixing chamber.

(2) Description of the prior art

While the prior art discloses conveyors for conveying materials to be mixed toward a mixing chamber, the prior art does not disclose a machine like applicant's in which one conveyor is superimposed on another and in which the one end of the lower conveyor extends rearwardly farther than the rear end of the upper conveyor. Such arrangement provides for compactness that cannot be achieved by the disclosures in the prior art.

SUMMARY OF THE INVENTION

The mixing machine comprises a frame, preferably in the form of a vehicle. The frame supports a mixing chamber, preferably of the rotating type. The frame also carries two conveyors, one of which is disposed above the other. The lower conveyor extends rearwardly farther than the rear end of the upper conveyor. At least two and preferably three containers in the form of hoppers, for the materials to be mixed, are disposed above the conveyors. Two of the three hoppers have outlets which are disposed above the upper conveyor. The third hopper has an outlet above and adjacent the rear end of the lower conveyor.

The conveyors convey the materials toward and preferably directly into the inlet to the mixing chamber. The inlet to the mixing chamber is at the rear thereof and the outlets for the mixed materials are at the front of the chamber. The mixed materials are suitably directed to where desired from the outlets of the mixing chamber as the machine moves forwardly.

Other features and the advantages of the present invention will be apparent from the following description, reference being had to the accompanying drawings wherein a preferred embodiment of the invention is illustrated.

BRIEF DESCRIPTION OF THE DRAWINGS

FIG. 1 is a side view of the mixing machine;
FIG. 2 is a top plan view of the machine.

DESCRIPTION OF THE PREFERRED EMBODIMENT

Figure 3:
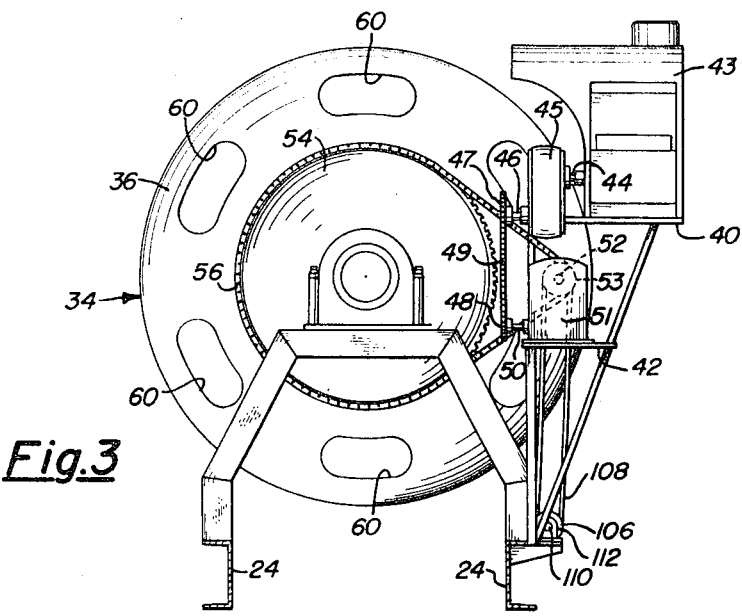
FIG. 3 is a front view of the machine, the frame forming the support for the machine being shown in section, the section being taken along 3—3 of FIG. 1, but on a larger scale.

A mixing machine 20 includes a main frame 22 including two spaced, horizontally extending steel C-shaped frame members 24 and joining frame members 26 and 28 (see FIGS. 2, 3 and 4), which are fixed to the members 24. The frame 22 is supported by two axially aligned wheels, one of which is shown in FIG. 1 at 30. These wheels are disposed rearwardly of the front of the frame. The forward end of the frame is suitably connected to the rear end of a tractor (not shown) through a coupling 32.

The mixing chamber 34 comprises an elongated and horizontally extending tube 36. The axis of the tube extends longitudinally of the frame members 24 and is supported by rollers 38 which are carried on the top of the frame members 24.

Platforms 40 and 42 are carried by the frame 22 forwardly of the mixing chamber 34. The upper platform 40 carries an engine 43 (see FIG. 3), the drive shaft 44 of which extends into a speed reduction gear box 45. A shaft 46 leading therefrom drives a sprocket 47 which, in turn, drives a sprocket 48 through a chain 49. Sprocket 48 drives a shaft 50 which leads into a speed reduction gear box 51. A shaft 52 extends from gear box 51, which shaft carries a sprocket 53. The sprocket is connected with a sprocket 54 which is axially aligned with the tube 36 of the mixing chamber 34 by a chain 56. Thus rotation is imparted to the tube about a horizontally extending axis.

Figure 4:
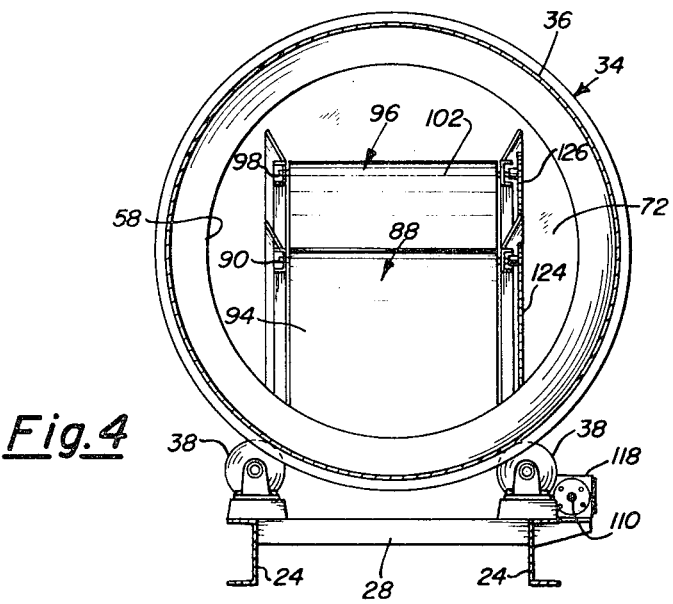
FIG. 4 is a sectional view taken along line 4—4 of FIG. 1, but on a larger scale, showing the inlet to the mixing chamber and the front ends of the conveyors.

As shown in FIG. 4, the rear end of the tube 36 is provided with a large inlet 58 for receiving the materials which are to be mixed. Suitable baffles (not shown) extend inwardly from the inside surface of the tube 36 for enhancing the mixing while the tube is rotated. A series of outlets 60 are disposed adjacent the front of the tube. The mixed materials pass sequentially from the outlets 60 when the outlets are respectively at and near their lowermost positions. The material when leaving the tube falls upon a conveyor 62, which is also suitably driven through gearing (not shown) which is actuated by the engine 43.

A plurality of containers, preferably in the form of hoppers 64, 66 and 68 are suitably fixed to and above the frame 22, rearwardly of the mixing chamber 34. Hoppers 64 and 66 are disposed side by side, and are separated by a vertically extending common wall 70. The hopper 68 is disposed rearwardly of the hoppers 64 and 66.

Figure 5:
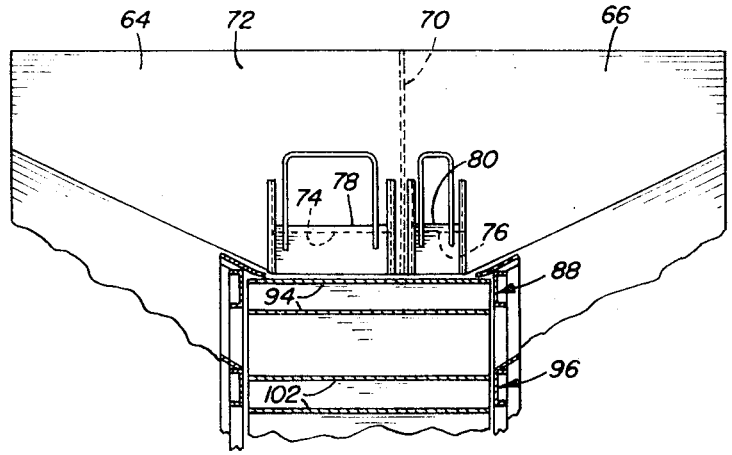
FIG. 5 is a sectional view taken along line 5—5 of FIG. 1, but on a larger scale, showing the gates for controlling the quantity of flow of materials from those hoppers which feed the upper conveyor.
Figure 6:
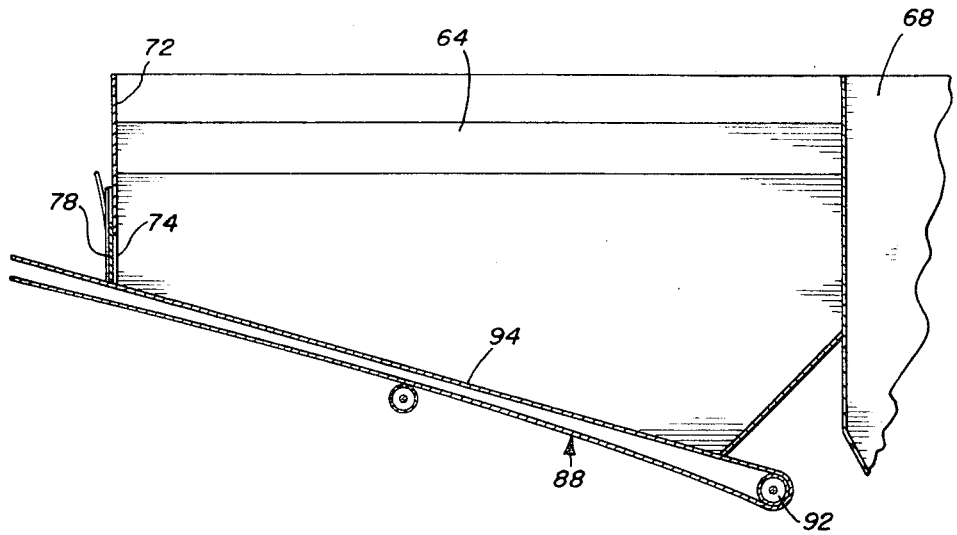
FIG. 6 is a fragmentary sectional view taken along line 6—6 of FIG. 2.

As seen more clearly in FIG. 5, the common front wall 72 of the hoppers 64 and 66 is provided with two outlets 74 and 76 at the lower ends of the hoppers 64 and 66, respectively. The flows of mixing materials from the outlets 74 and 76 are controlled by gates 78 and 80, respectively. These gates are adjustable vertically for controlling the respective quantities of materials from the front hoppers 64 and 66. The vertical position of the gates can be held in adjusted position in any suitable manner, well-known to those skilled in the art.

The rear hopper 68 is provided with an outlet 82 at the bottom thereof. This outlet is disposed rearwardly of the front hoppers 64 and 66. A vertical slidable gate 86 controls the rate of flow of material from the hopper 68.

An endless conveyor 88 is disposed partly below and throughout the length of both of the hoppers 64 and 66. This conveyor includes a front roller 90, a rear roller 92 and an endless belt 94. The upper run of the belt 94 forms the floor of both hoppers 64 and 66. An endless conveyor 96 is disposed below conveyor 88 and below hopper 68. Conveyor 96 includes a front roller 98, a rear roller 100 and an endless belt 102. Both conveyors 88 and 96 convey the materials to be mixed toward the inlet 58 of the mixing tube 36, and preferably the front rollers 90 and 98 of the conveyors 88 and 96 extend into the inlet 58 whereby the materials are dumped directly in the tube 36.

The conveyors 88 and 96 are also driven by the engine 43 through the shaft 52 which extends from gear box 51. Shaft 52 carries a sprocket 104 which drives a sprocket 106 through a chain 108. Sprocket 106 is fixed to a shaft 110 which is journaled in bearings 112. Shaft 110 rotates a shaft 113 through a hand-controlled clutch 114. The shaft is journaled in bearings 116. Shaft 113 extends into a gear box 118 containing bevel gears (not shown). The shaft for the driven bevel gears carries a sprocket which drives a shaft 120 through a chain 122. The shaft 120 carries three sprockets which drive two chains 124 and 126. Chain 124 drives a sprocket which is affixed to the front roller 90 of conveyor 88 and chain 126 drives a sprocket which is affixed to the front roller 98 of conveyor 96.

Thus it is apparent that when the engine 43 is operating and when the clutch 114 connects shaft 110 to shaft 113, both conveyors 88 and 96 carry the materials to be mixed into the mixing tube 36.

While not limited thereto, the present mixing machine is utilized for mixing fertilizer and sand. As an example, a mixture of approximately thirty percent peat moss, ten percent nitro humis and sixty percent said is desirable. The peat moss would be placed in hopper 64, the nitro humis would be placed in hopper 66 and the sand would be placed in hopper 68. The gates 74, 76 and 86 would be adjusted to feed the exemplary percentages into the mixing tube 36. The feeding of the materials to the conveyor, then to the inlet of the mixing chamber and out of the outlets 60 of the mixing chamber and onto the conveyor 62 takes place as the mixing machine is in operation. The conveyor 62 conveys the mixture to the stock pile or trucks.

From the foregoing it will be apparent that I have provided a mixing machine which can be utilized in an efficient manner for mixing materials for large areas such as fields and golf courses. The feeding is continuous as the machine is in operation. Compactness of the mechanism is assured by disposing at least one and preferably a plurality of hoppers forward of still another hopper. This is accomplished by superimposing the conveyor for the material or materials emanating from the front hopper or hoppers above the conveyor for the material emanating from the rear hopper. Compactness is also assured by utilizing the upper run of the belt 94 as the floors for hoppers 64 and 66.

Having described my invention, I claim:

1. A mixing machine comprising in combination:
 (A) means forming a rotatable mixing chamber having an inlet at one end thereof for materials to be mixed, and a plurality of spaced, radially extending outlets at the opposite end thereof;
 (B) means for delivering the materials to the inlet of the mixing chamber, said means including:
  (1) an endless conveyor for moving one of the materials to be mixed, said conveyor including:
   (a) two rollers having parallel and horizontally extending axes, one of said rollers being spaced forwardly of and at a higher level than the other, said forwardly disposed roller extending into the inlet of the mixing chamber,
   (b) a belt disposed about the rollers,
   (c) means for rotating one of the rollers for effecting movement of the top of the belt in a forward direction for conveying the material into the inlet of the mixing chamber;
  (2) a container for one of the materials to be mixed, the upper run of the belt forming the floor for the container, said container having an inlet and an outlet, the outlet being disposed above the top of the belt;
  (3) a second endless conveyor for moving another of the materials to be mixed, said second conveyor including:
   (a) a second set of two rollers, said latter rollers having parallel and horizontally extending axes, one of the latter rollers being spaced forwardly of and at a higher level than the other of the latter rollers, the forward roller of the second set of rollers being disposed adjacent and below the forward roller of the first mentioned conveyor and extending into the inlet of the mixing chamber, the other roller of the second mentioned set of rollers being disposed rearwardly of the roller of the first mentioned conveyor,
   (b) a belt disposed about the second mentioned rollers,
   (c) means for rotating one of the rollers of the second mentioned conveyor for effecting movement of the top of the belt of the second mentioned conveyor in a forward direction for conveying said other material into the inlet of the mixing chamber;
  (4) a container for another of materials to be mixed, said second mentioned container having an inlet and an outlet, the latter outlet being disposed above the top of the belt of the second mentioned conveyor;
 (C) means for rotating the mixing chamber.

2. A mixing machine as defined in claim 1, characterized to include:
 (B) (5) a third container for a third material to be mixed, said third container being disposed alongside the first mentioned container,
 and further characterized in that the upper run of the belt of the first mentioned conveyor forms the floor for the third mentioned container.

3. A mixing machine as defined in claim 2, characterized to include:
 (D) a vertically extending common wall between the first and third mentioned container, said wall extending to the upper run of the first mentioned belt.

References Cited

UNITED STATES PATENTS

| 3,088,711 | 5/1963 | Phillips | 259—161 X |
| 3,241,818 | 3/1966 | Haley | 259—161 X |
| 3,544,077 | 12/1968 | Van Elten | 259—3 |
| 2,739,797 | 3/1956 | Kemper | 259—161 |

FOREIGN PATENTS

| 577,388 | 5/1946 | Great Britain | 259—154 |

WALTER A. SCHEEL, Primary Examiner

P. R. COE, Assistant Examiner

U.S. Cl. X.R.

259—165, 169